June 9, 1942.    G. W. PICKELS    2,286,180

REMOTE METERING SYSTEM

Filed May 13, 1941

WITNESSES:
Leon M. Garman
Joe Weber.

INVENTOR
George W. Pickels.
BY G. M. Crawford
ATTORNEY

Patented June 9, 1942

2,286,180

UNITED STATES PATENT OFFICE 2,286,180

REMOTE METERING SYSTEM

George W. Pickels, Wilkinsburg, Pa., assignor to Westinghouse Electric & Manufacturing Company, East Pittsburgh, Pa., a corporation of Pennsylvania Application May 13, 1941, Serial No. 393,239

7 Claims. (Cl. 177—351)

My invention relates generally to remote metering systems and, more particularly, to systems for providing an indication at one station of an integrated quantity at a remote station.

Supervisory control systems operating between a control station and a remote station are commonly employed to control and supervise apparatus at the remote station, and to transmit to the control station from the remote station indications of quantities such as instantaneous voltage or current or watts. Heretofore, when it was desired to indicate an integrated or sum-total quantity, such as watthours, such indications were transmitted continuously since the total quantity depends upon both the rate and the elapsed time. Obviously, such integrated quantity indications cannot be continuously transmitted over the same conducting channel that is used, when desired, for remote control, supervision and metering of instantaneous quantities, since the interruption to the integrated quantity indications occasioned by these other operations would cause a considerable error in the indicated integrated quantity at the control station.

Since the expense of providing a separate conducting channel for the purpose of assuring accurate indications of integrated quantities by providing continuous indication of these quantities would be prohibitive, it is a purpose of my invention to provide a remote metering system which shall function to provide at a control station accurate indications of integrated quantities at a remote station employing a remote control system with a single channel, which channel may be employed as desired for supervisory control operations and remote metering of instantaneous quantities.

Another object of the invention is to provide a system for the remote metering of integrated quantities which shall function to accumulate potentialities proportional to the integrated quanties at one station for actuating an indicating means at another station while a communicating channel is not established between the stations, and which shall function to actuate the indicating means in accordance with the accumulated potentialities when a communicating channel is established.

A further object of the invention is to provide an impulse transmitting system for an impulse type remote metering system which shall function to transmit indicating impulses while a metering channel is connected in accordance with quantities metered while the channel is not connected, and which shall be simple and efficient in operation and inexpensive to manufacture, install, operate and maintain.

These and other objects and advantages of the invention will be apparent from the following detailed description taken in connection with the accompanying drawing, in which.

Figure 1:
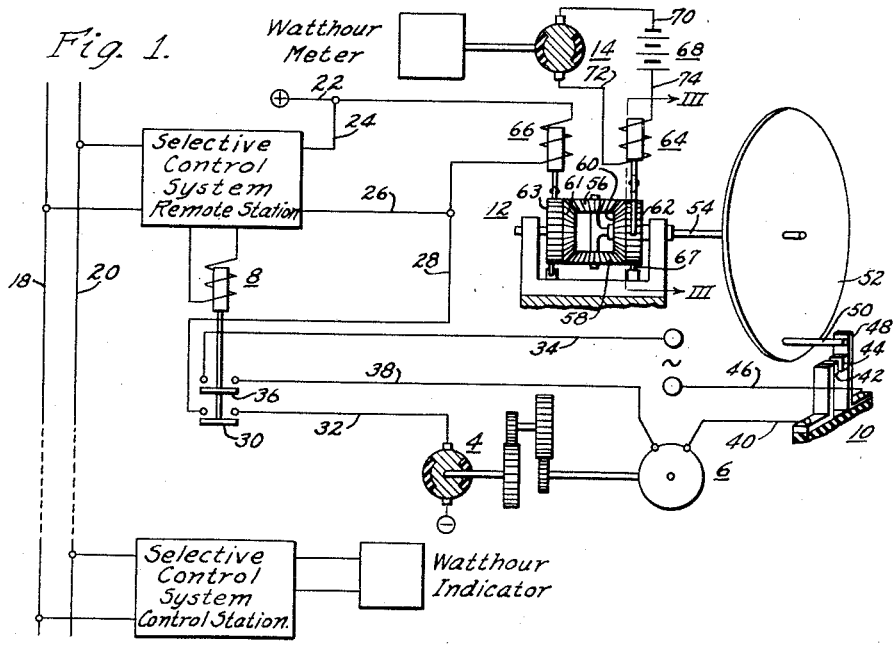
Figure 1 is a diagrammatic view of a remote metering system operating in conjunction with a remote control system embodying the principal features of one embodiment of my invention.

In practicing the embodiment of the invention shown in Fig. 1, a watthour indicator of the impulse responsive type at a control station may be connected for energization by impulses generated at a remote station by means of selective remote control systems extending over a conducting channel between the two stations. The impulses are generated by a rotary make-and-break device 4 which is driven by a motor 6. The impulse sending circuit is controlled by a relay 8 which is actuated by the selective control system when the metering point is selected at the control station. The motor 6 is also controlled by the relay 8 and by a circuit control device 10 which, in turn, is controlled by a differential device 12. The differential device 12 is actuated by a watthour meter through a make-and-break impulse device 14 and by the motor 6 through the make-and-break device 4, and causes the circuit control device 10 to be in closed circuit position when there is a differential between the total number of impulses generated by the impulse devices 4 and 14. Thus, the number of impulses generated by the watthour meter driven impulse device 14 will be generated by the impulse generating device 4 when it is connected in the impulse metering circuit.

Figure 2:
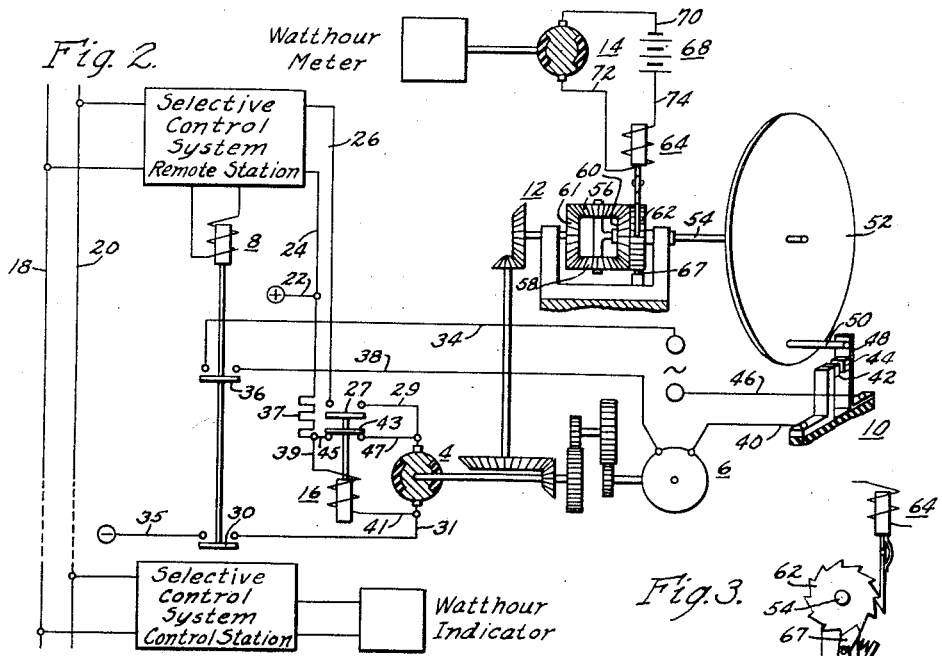
Fig. 2 is a diagrammatic view of a remote metering system operating in conjunction with a remote control system and embodying the principal features of another embodiment of the invention.

The system of Fig. 2 is similar to that of Fig. 1, except that it has a different drive for one side of the differential 12, and a relay 16 which functions to prevent false indications when the impulse generating device 4 is stopped in circuit closing position.

Considering the invention more in detail, the selective control system at the control station and the remote station, and including line conductors 18 and 20 extending between the stations, may be any suitable selective control system which is operable to select any of a number of control and metering points, or metering points only, at the two stations. A system which will function in this manner is fully described in the patent to H. P. Boswau, No. 2,148,044, issued February 21, 1939, and reference may be made to this patent for a detailed description of the functioning of such a system to select and operate control and/or metering points at remotely disposed stations.

The relay 8 at the remote station is a point relay which is energized when the particular point with which it is associated is selected at the control station and functions to render an impulsing circuit operative. The impulsing circuit is connected to be energized by a suitable source of power indicated by plus and minus signs and designated hereinafter as positive power and negative power, and extends from positive power through conductors 22 and 24, the selective control system at the remote station, which will function to actuate the impulse responsive indicator at the control station, conductors 26 and 28, a contact element 30 of the relay 8, a conductor 32 and the make-and-break device 4 to negative power.

The relay 8 also controls the circuit of the motor 6 which drives the make-and-break device 4 which extends from one terminal of any suitable source of power, indicated here as an alternating-current source, through a conductor 34, a contact element 36 of the relay 8, a conductor 38, the motor 6, a conductor 40, the contact elements 42 and 44 of the circuit control device 10 and a conductor 46 to the other terminal of the source of power.

Figure 3:
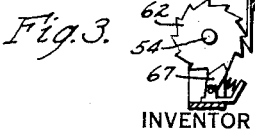
Fig. 3 is a slightly enlarged view of an element of the device taken along line III——III of Fig. 1.

The contact element 44 of the circuit control device 10 is mounted upon a flexible member 48 which biases the contact element 44 toward the contact element 42. The flexible member 48 may be actuated by a pin member 50 to move the contact element 44 out of engagement with the contact element 42. The pin member 50 is mounted upon a disk member 52 which, in turn, is driven by a shaft 54. The shaft 54 is connected to be driven by the planet gear members 56 and 58 of the differential mechanism 12 which engage the driving or sun gear members 60 and 61 thereof. The gear member 60 is disposed to be actuated by a ratchet wheel 62 and the gear member 61 by a ratchet wheel 63. The ratchet wheels 62 and 63 are driven in opposite directions by step-by-step mechanisms actuated by solenoids 64 and 66, respectively. A side elevation view of this ratchet mechanism is shown in Fig. 3. A spring pressed detent member 67 prevents return movement and retards forward movement of the ratchet wheel 62, and a similar detent member is provided for the ratchet wheel 63. The solenoid 64 is intermittently energized in accordance with the operation of the watthour meter in a circuit which extends from one terminal of a battery 68 or any other suitable source of power, through a conductor 70, the make-and-break device 14 which is driven by the watthour meter, a conductor 72, the winding of the solenoid 64 and a conductor 74 to the other terminal of the battery 68.

The solenoid 66 is intermittently energized by the make-and-break device 4 in a circuit which extends from positive power, through the conductor 22, the winding of the solenoid 66, the conductor 28, the contact element 30, the conductor 32 and the make-and-break device 4 to negative power. Thus the solenoid 66 is energized simultaneously with the energization of the watthour indicator at the control station, since its winding is in parallel circuit relation with the impulsing circuit which acts through the selective control system to actuate the watthour indicator.

In the operation of the system shown in Fig. 1, the watthour meter will operate during the periods of energy consumption and will generate impulses by operation of the make-and-break device 14 to cause the gear member 60 to be actuated by the ratchet mechanism which, in turn, will result in actuation of the disk 52 and the pin 50 in the clockwise direction to permit engagement of the contact members 42 and 44.

When it is desired to indicate the total watthours measured by the watthour meter, the selective control system at the control station associated with the metering point may be actuated to thereby actuate the relay 8 at the remote station and connect the impulsing circuit to energize the watthour indicator through the selective control system.

When the relay 8 is energized, the circuit of the motor 6 will be completed by the contact element 36 and the impulsing circuit will be completed by the contact element 30 of the relay 8. The impulses generated by the make-and-break device 4 will be transmitted to and will actuate the watthour indicator and will also actuate the solenoid 66 to cause the gear member 61 of the differential mechanism 12 to rotate in the opposite direction to the direction of rotation of the gear member 60 when driven by the watthour meter. The speed of the motor 6 is so chosen as to provide a greater speed of pulsing by the make-and-break device 4 than by the make-and-break device 14, and the resultant differential motion of the gear members 60 and 61 will rotate the disk member 52 in the counter-clockwise direction to cause the pin member 50 to engage the flexible member 48 and disengage the contact elements 42 and 44 when the make-and-break device 4 has caused the impulsing circuit to transmit the same total number of impulses to the watthour indicator as have been generated by the watthour meter, through its make-and-break device 14.

Thus the impulses generated by the watthour meter will be stored by the clockwise rotation of the disk 52, and as the difference between the stored impulses and the transmitted impulses decreases, the disk member 52 will rotate in the counter-clockwise direction until the number of stored and transmitted impulses is equal, at which time the motor 6 will be stopped by the opening of the circuit control device 10 and the transmission of impulses to the watthour indicator will be stopped.

In the embodiment of the invention in Fig. 2, the gear member 61 is driven by direct mechanical connection, as indicated by the motor 6, instead of by the escapement mechanism actuated by the solenoid 66, as indicated in Fig. 1. The impulsing circuit of the system of Fig. 2 extends from positive power, through the conductors 22 and 24, the selective control system at the remote station which will function to actuate the impulse responsive indicator at the control station, the conductor 26, a contact element 27 of the relay 16, a conductor 29, the make-and-break device 4, a conductor 31, the contact element 30 of the relay 8, and a conductor 35 to negative power. The energizing circuit for the relay 16 extends from the positive power, through the conductors 22 and 24, a current limiting resistor 37, a conductor 39, the winding of the relay 16, conductors 41 and 31, the contact element 30 and the conductor 35 to negative power. A back contact element 43 of the relay 16 controls a shunting circuit for the winding of the relay 16 which extends from one terminal of the winding of the relay 16, through conductors 39 and 45, the back contact element 43 of the relay 16, a conductor 47, the make-and-break device 4 and the conductor 41 to the other terminal of the winding of the relay 16.

In the operation of the system of Fig. 2, when the make-and-break device 4 is stopped with its contact element in circuit closing position, as indicated in the drawing, and when the metering point is disconnected by the selective control system, the relay 16 will prevent a false impulse from being transmitted to the impulsing circuit when the metering point is again selected. With the make-and-break device 4 in the circuit closing position, as shown in the drawing, when the relay 8 is again energized by selective control from the control station, the motor 6 will be operated, but the impulsing circuit will not be completed by the contact element 27 of the relay 16 until the shunting circuit for the winding of the relay 16 is broken by the movement of the make-and-break device 4 to open circuit position.

When the make-and-break device 4 moves to open circuit position, the shunting circuit heretofore described will be removed from the winding of the relay 16 and the relay 16 will be energized to close its contact element 27 and thus complete the impulsing circuit, so that impulses will be transmitted to the watthour indicator thereafter upon each movement of the make-and-break device to circuit closing position.

The energization of relay 16 will also cause its contact element 43 to open to thus prevent reestablishment of the shunting circuit when the make-and-break device 4 again moves to circuit closing position. When the relay 16 is deenergized by the dropping of the relay 8, the contact element 43 of the relay 16 will again close.

It is to be understood that the impulsing circuit of the embodiment of the invention of Figs. 1 may be similarly modified by the addition of the relay 16 to prevent repetition of impulses when the metering point is selected in the event that the make-and-break device 4 has previously stopped in circuit closing position.

It is to be understood that the system herein described is not limited to operation with a selective control system having direct electrical connection between the remote and control systems, but may be used with any selective control system where circuits at a remote station may be selected from a control station, and wherein impulses may be transmitted from the selected point at the remote station to a selected indicator at the control station. An example of such a system is shown in the patent to Franklin, No. 1,929,241, issued October 3, 1933, in which selective remote metering impulses are transmitted between remote and control stations over a carrier-current communication channel. It is to be further understood that the invention is not limited to the totalizing, transmitting and indicating of watthours, but may be employed to totalize any quantity at one station and transmit and indicate this total integrated quantity to another station.

It is to be understood that the system herein described is not limited in its response to a rotating make-and-break device such as 14 but may respond to any impulsing device which is operated a number of times which is a measure of any totalized quantity which is to be transmitted and indicated.

It is to be particularly noted that the system is especially adapted to be used in a selective control system where other points than the metering point are to be controlled and/or metered and which, therefore, require that the metering circuit be interrupted at intervals for the purpose of selecting and controlling these other points. Thus, it will be seen that I have provided a remote metering system which shall function to provide at a control station accurate indication of integrated quantities at a remote station employing a selective remote control system with a single channel, which channel may be employed, as desired, for other supervisory control operations and remote metering of instantaneous and/or other integrated quantities.

In compliance with the requirements of the patent statutes, I have shown and described herein the preferred embodiments of my invention. It is to be understood, however, that the invention is not limited to the precise construction shown and described but is capable of modification by one skilled in the art, the embodiments herein described being merely illustrative of the principles of my invention.

I claim as my invention:

1. In a remote metering system, a meter, a first impulse generating device actuated by the meter, a motor, a second impulse generating device actuated by the motor, a differential mechanism, impulse responsive means energized by said first impulse generating means for driving one side of said differential mechanism in one direction, impulse responsive means energized by said second impulse generating means for driving the other side of the differential mechanism in the opposite direction, and circuit control means responsive to the differential mechanism for energizing said motor while there is a greater total movement of said one side of said differential mechanism than the other.

2. In a remote metering system, a meter, a first impulse generating device actuated by the meter, a motor, a second impulse generating device actuated by the motor, a differential mechanism, impulse responsive means energized by said first impulse generating means for driving one side of said differential mechanism in one direction, means actuated by said motor for driving the other side of said differential mechanism in the opposite direction, and circuit control means responsive to the differential mechanism for energizing said motor while there is a greater total movement of said one side of said differential mechanism than the other.

3. In a remote metering system of the impulse type, an impulse generating means at one station comprising a circuit make-and-break device, an actuating means for said make-and-break device, and an impulse circuit controlled by said make-and-break device, an impulse responsive device at another station, means for energizing said impulse responsive device in accordance with the impulses generated by said impulse generating means, means for substantially simultaneously selectively rendering said actuating means inoperative and operative and said impulse circuit inoperative and operative respectively, and means controlled by said make-and-break device for rendering said impulse circuit inoperative when the make-and-break device has stopped in closed-circuit position until the make-and-break device has moved to the next open-circuit position upon the next actuation of the make-and-break device.

4. In an impulse type remote metering system, an impulse generating means at one station comprising a circuit make-and-break device, an actuating means for said make-and-break device, and an impulse circuit controlled by said make-and-break device, an impulse responsive device at another station, remote control means at and extending between the said stations, means including said remote control means for energizing said impulse responsive means in accordance with the energization of said impulse circuit by said make-and-break device, means including said remote control means for substantially simultaneously selectively rendering said actuating means and said impulse circuit operative and inoperative, and means controlled by said make-and-break device for rendering said impulse circuit inoperative when the make-and-break device has stopped in closed-circuit position until the make-and-break device has moved to the next open-circuit position upon the next actuation of the make-and-break device.

5. In an impulse type remote metering system, an impulse generating means comprising a circuit make-and-break device, an actuating means for said make-and-break device, and an impulse circuit controlled by said make-and-break device, means for substantially simultaneously selectively rendering said actuating means inoperative and operative and said impulse circuit inoperative and operative respectively, and means controlled by said make-and-break device for rendering said impulse circuit inoperative when the make-and-break device has stopped in closed-circuit position until the make-and-break device has moved to the next open circuit position upon the next actuation of the make-and-break device.

6. In an impulse type metering system, an impulse generating means comprising a circuit make-and-break device, an actuating means for said make-and-break device, and an impulse circuit controlled by said make-and-break device, means for substantially simultaneously selectively rendering said actuating means inoperative and operative and said impulse circuit inoperative and operative respectively, a meter, means for rendering said actuating means inoperative when the ratio of the total movement of the meter to the total movement of the actuating means is above a predetermined amount, and means controlled by said make-and-break device for rendering said impulse circuit inoperative when the make-and-break device has stopped in closed-circuit position until the make-and-break device has moved to the next open-circuit position upon the next actuation of the make-and-break device.

7. In an impulse type remote metering system, an impulse generating means at one station comprising a circuit make-and-break device, an actuating means for said make-and-break device, and an impulse circuit controlled by said make-and-break device, an impulse responsive device at another station, remote control means at and extending between the said stations, means including said remote control means for energizing said impulse responsive means in accordance with the energization of said impulse circuit by said make-and-break device, means including said remote control means for substantially simultaneously selectively rendering said actuating means and said impulse circuit operative and inoperative, a meter at said one station, means for rendering said actuating means inoperative when the ratio of the total movement of the meter to the total movement of the actuating means is above a predetermined amount, and means controlled by said make-and-break device for rendering said impulse circuit inoperative when the make-and-break device has stopped in closed-circuit position until the make-and-break device has moved to the next open-circuit position upon the next actuation of the make-and-break device.

GEORGE W. PICKELS.